United States Patent [19]
Smith et al.

[11] Patent Number: 6,098,231
[45] Date of Patent: Aug. 8, 2000

[54] PIPELINE PIGS

[75] Inventors: Ian Smith, Ashington; Peter Allan Couchman, Newcastle upon Tyne; Brian Kenneth Campbell Jones, Ashington, all of United Kingdom

[73] Assignee: PII Limited, Cramington, United Kingdom

[21] Appl. No.: 09/096,376

[22] Filed: Jun. 12, 1998

[30] Foreign Application Priority Data

Jun. 12, 1997 [GB] United Kingdom .................. 9712147

[51] Int. Cl.$^7$ .................................. B08B 9/055
[52] U.S. Cl. ........................................ 15/104.061
[58] Field of Search ................. 15/104.061, 104.063

[56] References Cited

U.S. PATENT DOCUMENTS

| | | | |
|---|---|---|---|
| 2,315,133 | 3/1943 | Riney et al. | 15/104.061 |
| 2,392,144 | 1/1946 | Hall | 15/104.061 |
| 2,575,624 | 11/1951 | Hall | 15/104.061 |
| 2,860,356 | 11/1958 | Matheny | 15/104.061 |
| 3,495,546 | 2/1970 | Brown et al. | 15/104.061 X |
| 3,708,819 | 1/1973 | Bresston | |
| 5,208,936 | 5/1993 | Campbell | 15/104.061 |
| 5,795,402 | 8/1998 | Hargett, Sr. et al. | 15/104.061 X |

FOREIGN PATENT DOCUMENTS

| | | |
|---|---|---|
| 745 436 | 12/1996 | European Pat. Off. . |
| 975302 | 11/1997 | Norway . |
| 2081051 | 5/1982 | United Kingdom . |
| 2097537 | 11/1982 | United Kingdom . |

*Primary Examiner*—Mark Spisich
*Attorney, Agent, or Firm*—Larson & Taylor

[57] ABSTRACT

A pipeline pig comprises a body and at least one flexible annular outwardly extending seal on and around the body for sealingly contacting a pipeline interior wall under differential fluid pressure whereby to propel the pig along the pipeline. The pig also comprises a fluid bypass duct arrangement extending through the body and resilient frictional bristles on and extending from the body adapted to contact the pipeline interior wall and exert a drag on the pig. An adjustable bypass flow control unit is provided which is adapted to regulate fluid flow through the duct arrangement and thus the speed of the pig.

8 Claims, 2 Drawing Sheets

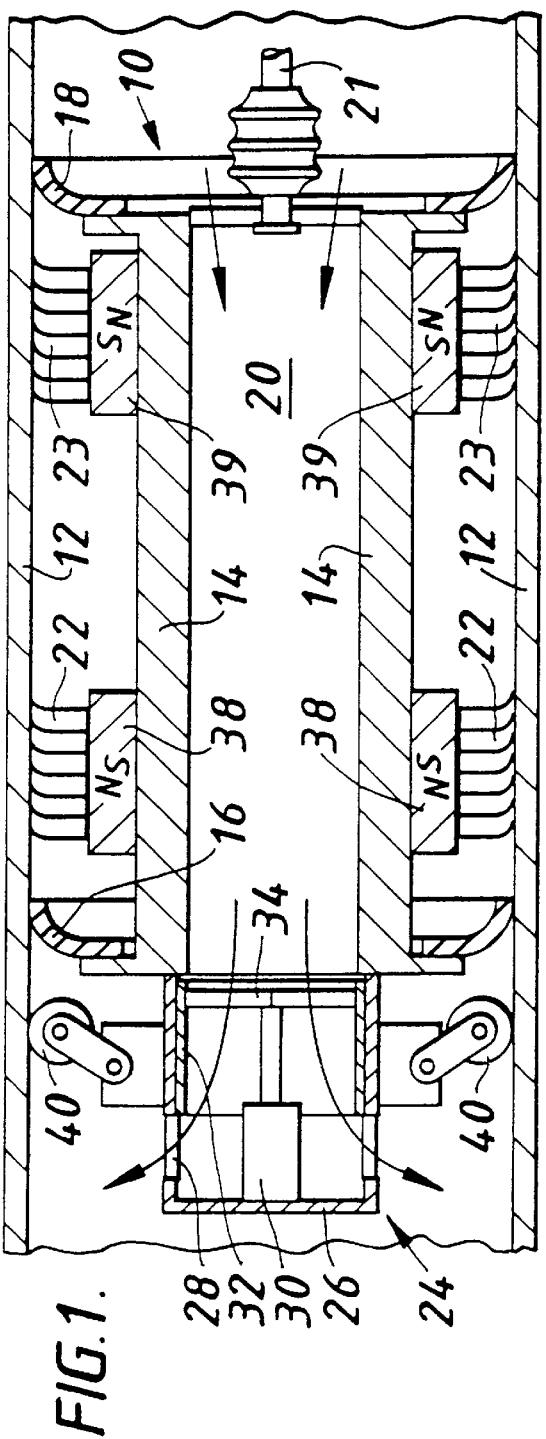
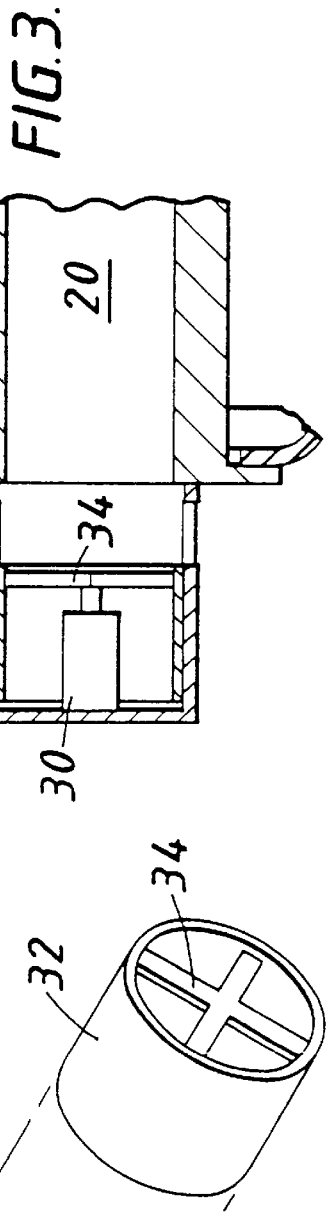
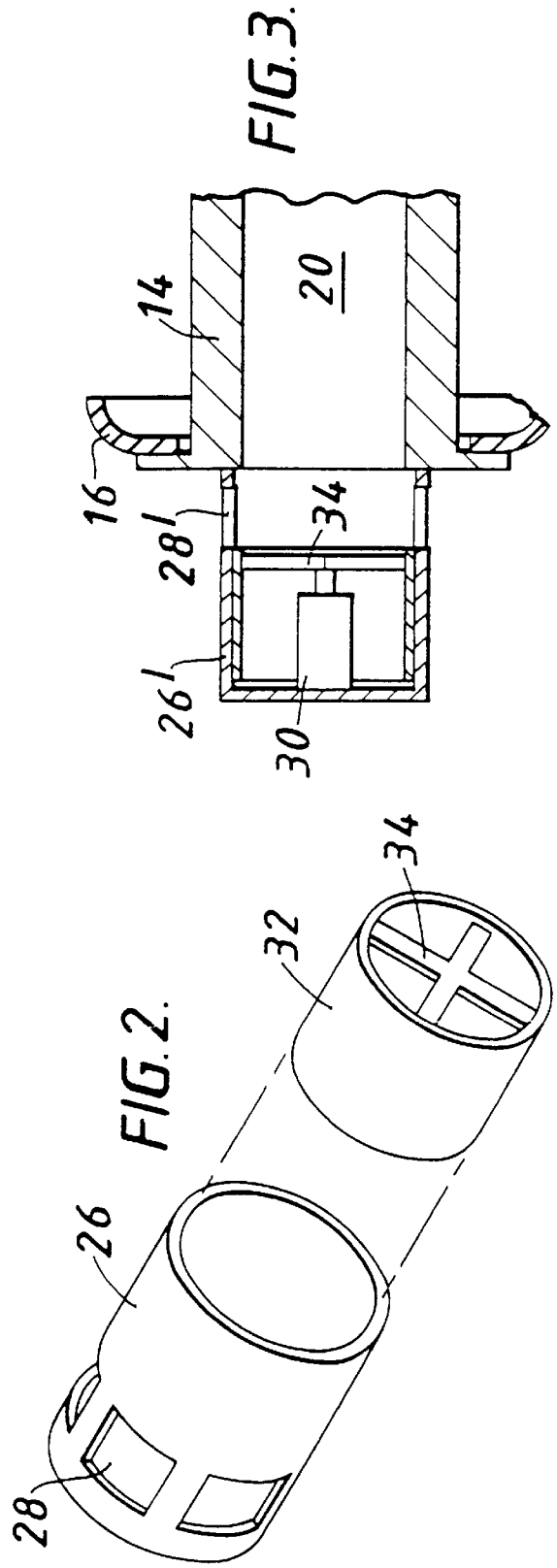

PIPELINE PIGS

BACKGROUND OF THE INVENTION

This invention relates to pipeline pigs.

Devices know as pigs are commonly passed through pipelines in order to service or inspect the pipeline. A pig may contain the necessary servicing or inspection equipment or may draw other devices behind it. In pipelines for conveying fluids, the pig is commonly driven along the pipeline by the flow of the pipeline fluid. To achieve this the pig may be fitted with one or more flexible disks or cups attached to the body of the pig and extending outwardly to the interior pipe wall so as to form a sufficient seal in the pipeline. Such arrangements have been known and used for many years. If the seal is substantially complete, the pig will travel at the speed of the pipeline fluid.

In gas pipelines in particular, it can be advantageous for the pig to travel more slowly than the speed of the gas. This can arise when the pipeline operator wishes to maintain a high value gas flow in the pipeline in order to supply customers and maintain income while running pigs that may operate most effectively at lower speeds. Inspection pigs generally have a limit on their maximum speed above which the inspection performance is degraded or impaired. Similar considerations can also apply to cleaning pigs. Unnecessarily slow pig speeds are also desirably avoided. Accordingly, a pipeline pig is likely to have an optimum operating speed window.

In order to be able to reduce the speed of the pig, it has been proposed to provide a pig with a gas bypass. British Patent No. 2097537 discloses an example in which gas flow through an annular array of ducts in the body of the pig is regulated by controlling the number of ducts that are open at any time, by opening or closing each duct by a butterfly valve operated by a corresponding actuator, in response to an error signal derived from a comparison of the sampled speed of the pig with stored upper and lower speed threshold values.

U.S. Pat. No. 5,208,936 discloses a similar annular arrangement of ducts that are simultaneously adjusted for effective flow area by a rotatable orifice plate at one end. Spaced apart orifices in the plate are more or less aligned with the ducts by rotation of the plate by a stepper motor in response to the speed of the pig as measured by a pickup wheel.

SUMMARY OF THE INVENTION

This invention is concerned with improvements in the gas bypass control of pipeline pigs, allowing a pig to run at a speed close to or preferably within its operating window while the pipeline fluid is flowing at a higher speed.

In accordance with the invention there is provided a pipeline pig for location in a pipeline having an internal wall, the pig comprising a body and at least one flexible annular outwardly extending seal on and around the body for sealingly contacting the pipeline interior wall under differential fluid pressure whereby to propel the pig along the pipeline, fluid bypass ducts means through the body, resilient frictional means on and extending from the body adapted to contact the pipeline interior wall and exert a drag on the pig, and adjustable bypass flow control means adapted to regulate gas flow through the duct means.

The actual speed of the pig will be influenced not only by the conformation and condition of the interior of the pipeline but also by variations in the fluid flow rate, particularly in connection with the launch and receive of the pig, where the driving flow rate may be lower than for the main pipeline, or at side connections when flow may occur into or out of the pipeline, and also by virtue of density changes as the gas expands in the pipeline. Accordingly, in a preferred aspect of the invention, the adjustable bypass flow control means may be adjustable not only prior to the deployment of the pig in the pipeline, but also while the pig is in the pipeline.

In order to adjust the bypass flow control means during the deployment of the pig, the pig may further comprise an actuator for the flow control means, and control means for the actuator adapted to determine the current average speed of the pig in the pipeline, to compare the average with a desired speed, and to control the actuator to regulate the bypass flow control means whereby to adjust the pig speed towards the desired speed.

The flexible seal may comprise resilient drive cups of suitable material such as natural or synthetic rubber, polyurethane or other material known for the purpose. The resilient frictional means may comprise a plurality of bristles mounted on the exterior of the pig body, extending outwardly to substantially the same or a greater radial distance than the seal. The bristles may be mounted on magnets arranged to increase the contact force between the bristles and the pipe wall, so further increasing the drag.

The fluid bypass duct may be a single axial duct through the pig body, but a plurality of bypass ducts are possible, in which case some or all may be provided with adjustable bypass flow control means, which may be independent or common.

The actuator may be fluid powered, but an electrically driven actuator may alternatively be provided. Preferably, a hydraulic fluid powered actuator is provided, controlled by a hydraulic solenoid valve and an electrically powered hydraulic pump.

The control system, including the control means for the actuator, measures the actual speed of the pig through the pipeline, averages the speed over a normally predetermined time period, and compares it with the operating speed window of the pig. If the average speed goes outside this operating window the actuator will be powered to increase or decrease the opening of the bypass flow control means as appropriate. The flow control means may be fitted at one end of the bypass duct, but could be at an intermediate position if required.

The pig will normally carry or tow its own electrical battery as a source of electric power for the control system, including the actuator. Electrical and hydraulic components of the control system may be shielded from the pipeline fluid within a pressure vessel.

BRIEF DESCRIPTION OF THE DRAWINGS

FIG. 1 is a longitudinal sectional view through a pig in accordance with the invention, in a pipeline;

FIG. 2 is a perspective view showing a detail of adjustable bypass flow control means used in the embodiment shown in FIG. 1;

FIG. 3 is a partial longitudinal section through a second pig, which differs from that shown in FIG. 1 in its bypass flow control means.

DESCRIPTION OF THE PREFERRED EMBODIMENTS

Figure 4:
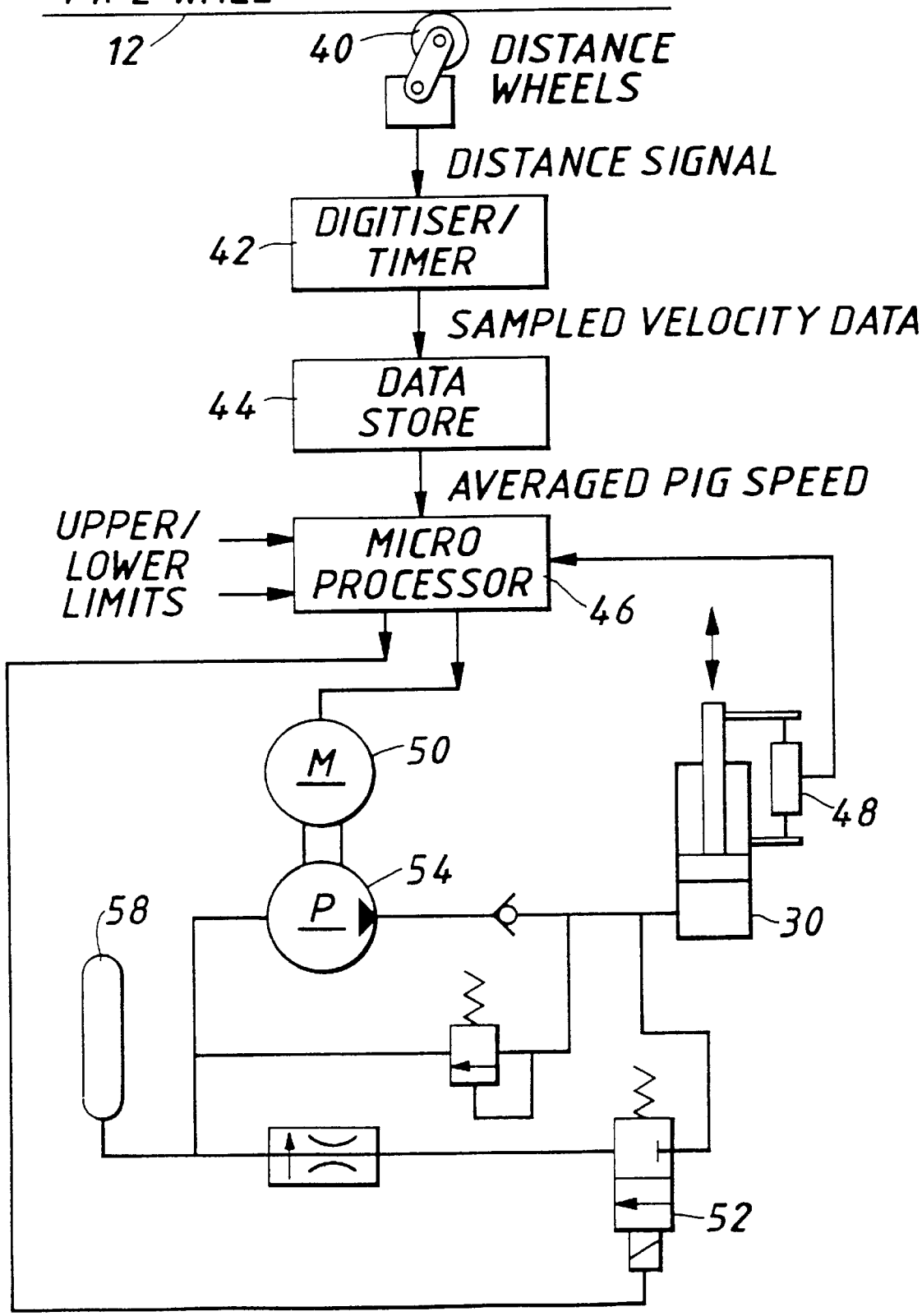
FIG. 4 is a schematic diagram of the electrical and hydraulic control and actuation system.

In FIG. 1 a gas pipeline pig 10 occupies a section of pipeline 12. The pig has a body 14, of generally cylindrical form, as shown. Mounted on a flange around the front or leading end of the body is a flexible, resilient drive cup 16. Mounted on a flange around the rear end of the body is a flexible, resilient drive cup 18. These drive cups are of conventional structure and composition, and sealingly engage the inner wall surface of the pipeline to propel the pig forwards under differential fluid pressure in a gas stream flowing from behind the pig.

The body of the pig has a broad axial through passage 20 which functions as a fluid bypass duct. Gas can flow through the duct, enabling the pig to travel more slowly than the gas stream. The amount of gas which will flow through the duct is dependent on the area of the duct and also on the differential pressure which in turn depends on the frictional drag of the pig in the pipeline. The rear of the pig body carries a jointed coupling 21 to permit a trailer (not shown) to be drawn behind the pig.

Accordingly, the body is surrounded by two longitudinally spaced rings or resilient frictional means, in the form of a front ring of bristles 22 and a rear ring of bristles 23, which make frictional contact with the inside of the pipeline wall 12 and exert a drag on the pig as it moves forward. The bristles may be mounted on respective front and rear magnets 38 and 39 arranged to urge the bristles into further contact with the pipe wall so further increasing the frictional drag of the pig. This arrangement provides a large drag for a range of pipeline bores and can provide bypass flow which is substantially independent of pipeline bore.

The magnets 38 at the front end of the pig body 14 are arranged with the north pole in the outward face, and the south pole against the pig body, while the magnets 39 at the rear end have the south pole on the outward face and the north pole towards the pig body. The bristles, pig body and pipeline wall 12 are all of ferromagnetic material, usually steel. In this way a closed magnetic circuit is formed around front magnets 38, front bristles 22, pipe wall 12, rear bristles 23, rear magnets 39 and pig body 14. Magnetic flux passes around this circuit generating large attraction forces at the interface between the outer ends of tips of the bristles and the pipe wall. These attraction forces in turn enhance the frictional drag of the bristles against the wall. Within the limit imposed by the length of the bristles, when fully extended radially, the drag is less dependent on the pipe bore. The magnets may be permanent magnets or electromagnets. In the latter case, the magnetic forces can be controlled by varying the input power to the magnets.

At the leading or gas exit end of the bypass duct, although equally possible at the rear or gas entry end, is adjustable bypass control means in the form of sleeve valve 24, also shown in FIG. 2. This valve comprises a hollow cylindrical shell 26 mounted on the end of, and coaxial with, the duct 20, open to the duct at one end and closed at its opposite end. One or more gas exit ports 28 are formed and located circumferentially in the cylinder wall adjacent to its closed end, which forms the mount for a hydraulic actuator 30. The actuator acts on a rigid spider 34 fixed in a sleeve 32, which is a close axial sliding fit within the cylinder 26, so that the extension of the actuator pushes the sleeve to the position illustrated in FIG. 1, exposing the full length of the gas exit ports to gas flow out of the bypass duct.

Retraction of the actuator draws the sleeve over the exit ports, effectively closing the bypass duct. By controlling the actuator between these extreme positions, a continuous range of intermediate gas bypass flows may be produced, to vary the differential pressure and regulate the speed of the pig.

Hydraulic pressure is required to extend the actuator, so in the event of hydraulic failure, the duct is closed. In the variant embodiment shown in FIG. 3, in contrast, the gas exit ports 28' have been repositioned at the opposite, open, end of the cylinder 26'. Now, hydraulic oil failure will cause the bypass duct to remain open, as shown.

Distance measuring wheels 40 are mounted on the sleeve valve 24 at the front of the pig body. These are spring biased outwardly against the pipeline wall to generate electrical signals which are used as follows to control the hydraulic actuator 30 and regulate the speed of the pig within its desired optimum upper and lower limits.

FIG. 4 shows the preferred speed control system in schematic form. One or more distance measurement wheels 40 running along the pipe wall generate distance signals which are processed by a digitiser/timer unit 42. These signals are passed to a sampled data store 44 which stores the most recently generated values and averages over these values to give the averaged pig speed which is passed to a microprocessor 46. The microprocessor processes this averaged speed signal together with upper and lower speed band limits and a signal showing the bypass valve current position as measured by a transducer 48. The output of the microprocessor is a decision to power the electric motor 50, which drives the hydraulic pump 54 to extend the ram 30, or to power the solenoid valve 52 to allow fluid to bleed from the ram, or to power neither. A hydraulic fluid accumulator 58 supplies fluid to the system and receives fluid from the system.

These actions cause the hydraulic ram 30 to position the bypass valve shown in detail in FIG. 1 and FIG. 2 to the required position as determined by the software which operates the microprocessor.

In the event of hydraulic failure, the solenoid vale 52 can still be operated to enable pipeline gas pressure to close the bypass valve 24 and ensure recovery of the pig from the pipeline. The alternative bypass valve shown in FIG. 3 allows the valve to open upon loss of hydraulic power.

This mode of operation is potentially of benefit where the pig is operating in lines at very high flow rates which cannot under any circumstances be reduced and where failure of the bypass valve to the closed position would result in a dangerously high pig speed.

Items of this control system other than the distance wheels and the ram may be housed within a pressure vessel to protect them from the pipeline fluid. This pressure vessel may be towed by coupling 21 behind the pig shown in FIG. 1.

What We claim and desire to secure by Letters Patent are:

1. A pipeline pig for location in a pipeline having an interior wall, the pig comprising a single, unitary substantially rigid pig body and at least first and second flexible annular outwardly extending seals, disposed on and around the body, at spaced locations along the body, for sealingly contacting the pipeline interior wall under differential fluid pressure whereby to propel the pig along the pipeline, fluid bypass duct means extending through the body, a plurality of resilient bristles mounted on the exterior of the pig body between said first and second seals and extending outwardly from the body so as to frictionally contact the interior wall of the pipeline, magnetic means mounted on the pig body for urging the bristles into enhanced frictional contact with the pipeline interior wall such as to maintain a drag on the pig under variations in the bore of the pipeline, and adjustable bypass flow control means on the pig body for regulating fluid flow through the duct means.

2. A pipeline pig according to claim 1 wherein the bristles are adapted to form part of a magnetic circuit including the pig body and the pipeline wall.

3. A pipeline pig according to claim 1 wherein the adjustable bypass flow control means comprises a sleeve valve located at an end of the fluid bypass duct means.

4. A pipeline pig according to claim 1 wherein the fluid bypass duct means comprises an axial duct through the pig body.

5. A pipeline pig according to claim 1 further comprising an actuator for the adjustable bypass flow control means, and actuator control means for determining the current average speed of the pig in the pipeline, for comparing the average speed with a desired speed, and for controlling the actuator to regulate the bypass flow control means whereby to adjust the pig speed towards the desired speed.

6. A pipeline pig according to claim 5 wherein the actuator is hydraulic fluid powered, and is adapted to permit pipeline fluid pressure to close the bypass flow upon loss of hydraulic power.

7. A pipeline pig according to claim 1 wherein the flexible seal comprises a resilient drive cup.

8. A pipeline pig according to claim 1 wherein said bristles comprise long, slender, steel bristles.

* * * * *